April 17, 1956  N. DOVAS  2,741,913
BLOOD SEDIMENTATION RACK
Filed July 20, 1954  2 Sheets-Sheet 1
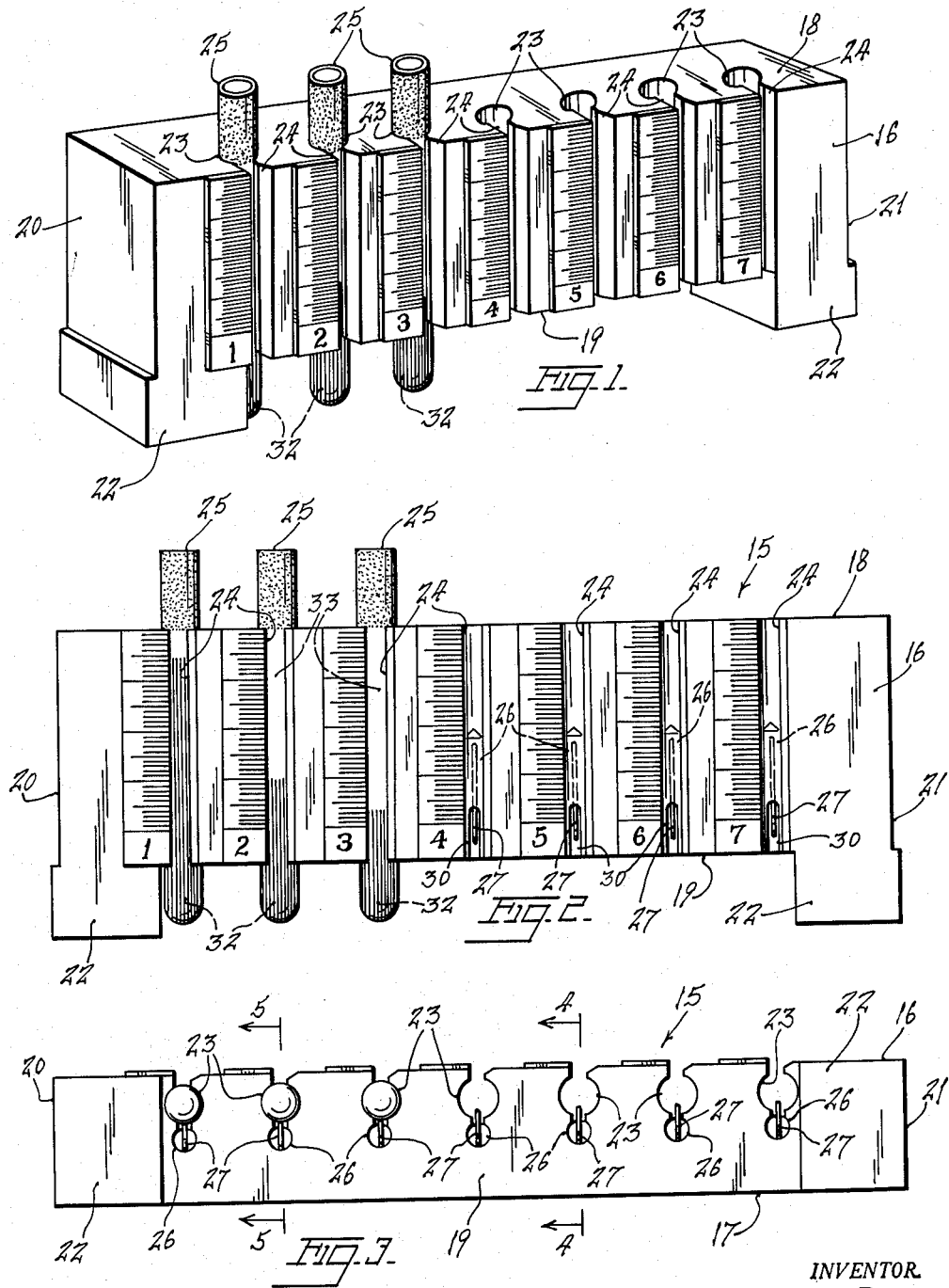
INVENTOR.
NICHOLAS DOVAS
BY
ATTORNEY April 17, 1956 — N. DOVAS — 2,741,913
BLOOD SEDIMENTATION RACK
Filed July 20, 1954 — 2 Sheets-Sheet 2

INVENTOR
NICHOLAS DOVAS
BY
ATTORNEY

United States Patent Office 2,741,913
Patented Apr. 17, 1956

2,741,913

BLOOD SEDIMENTATION RACK

Nicholas Dovas, New York, N. Y.

Application July 20, 1954, Serial No. 444,456

5 Claims. (Cl. 73—61)

This invention relates to new and useful improvements in racks for holding ungraduated sedimentation tubes against a graduated background.

More particularly, the present invention proposes the construction of an improved sedimentation tube rack which can be used easily and conveniently to hold sedimentation tubes, graduated or ungraduated, so that accurate sedimentation readings can be made at timed intervals.

As a further object, the present invention proposes forming an improved sedimentation tube rack for medical laboratory technicians and the like which can be used to support sedimentation tubes in a vertical position to determine the sedimentation rate of red blood cells or other such matter and in which each of a number of such tubes may be placed for accurate alignment with a graduated scale.

Still further, the present invention proposes a means to eliminate the use of graduation marks on the sedimentation tube, since with this device the blood level is lined up with the zero marking of the rack and the reading can be made without removing the tube from the rack.

Another object of the present invention is to provide an accurate sedimentation tube holding rack which can be made easily and inexpensively and which can be kept in accurate condition and repair as simply and easily.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a sedimentation tube rack constructed and arranged in accordance with the present invention.

Fig. 2 is a front view of the structure shown in Fig. 1.

Fig. 3 is a bottom plan view of the structure shown in Figs. 1 and 2.

Figure 4:
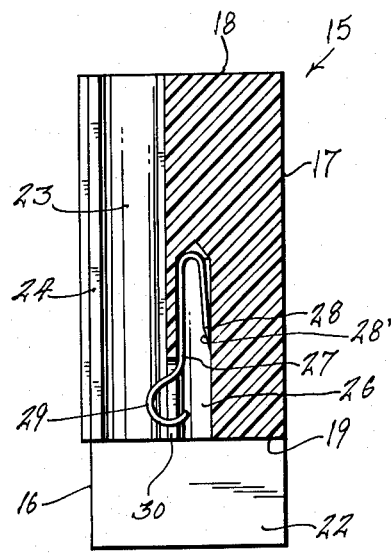
Fig. 4 is a sectional view taken on line 4—4 of Fig. 3.
Figure 5:
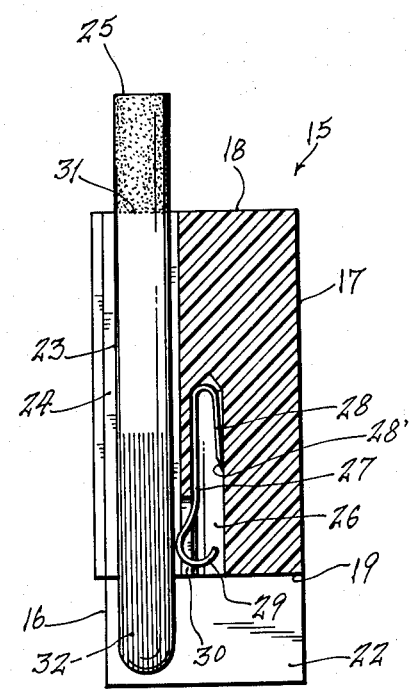
Fig. 5 is a sectional view taken on line 5—5 of Fig. 3.

The sedimentation tube holding rack, in accordance with the first form of the present invention illustrated in Figs. 1 to 5, inclusive, has a body block member 15 made preferably of a single piece of transparent plastic material.

Block member 15 has a front face 16, rear face 17, top face 18, bottom face 19 and end faces 20 and 21. A pair of spaced bottom feet 22 are provided on the body block member 15.

Formed in the central portion of the body block member 15, between the bottom feet 22 at each end of the body block member 15, are a plurality of spaced vertically disposed sedimentation tube openings 23. These cylindrical openings or holes 23 are disposed adjacent the front face 16 and extend through and between the top and bottom faces 18 and 19 of member 15. Any number of the openings 23 may be provided, seven such openings 23 being shown in the structure illustrated in Figs. 1 to 5, inclusive.

A plurality of spaced slit openings 24 of smaller width than the diameters of the sedimentation tube openings 23 are provided in the body block member 15 extending through the front face 16 and connecting the front face 16 with the sedimentation tube openings 23.

A plurality of spaced graduated scales 24 are mounted on the front face 16 of body block member 15 and disposed each at one side of one of the slit openings 24 in the front face 16. Each scale 24 partially extends across the sedimentation tube opening connected with the slit opening next to which it is mounted so as partially to overlie a sedimentation tube 25 in such sedimentation tube opening.

Behind the sedimentation tube openings 23 a plurality of spring clip holding recesses 26 are formed, one such recess being behind each tube opening 23. The recesses 26 are cylindrical holes extending from the bottom face 19 and vertically disposed parallel to the sedimentation tube openings 23. Recesses 26 are much smaller in diameter than the openings 23, the openings 23 being of a diameter larger than that of the sedimentation tubes 25.

A plurality of spring clips 27 are provided one for each sedimentation tube opening 23. Spring clips 27 each have a hairpin bent end portion 28 formed with a sharp point 28', adapted frictionally to seat in and be secured in one of the spring clip seating recesses 26. Spring clips 27 also each have another end portion 29 adapted to project into one of the sedimentation tube openings 23 like a leaf spring to hold a sedimentation tube 25 in such tube opening 23. The recesses 26 are each connected with their adjacent sedimentation tube opening 23 by a passage 30 and it is through such passages that the end portions 29 of the spring clips 27 project.

In operation, sedimentation tubes 25 are inserted into the sedimentation tubes openings 23 from the top face 18 and aligned with the zero mark on the rack. This will permit all tubes to be inserted in the openings 23 to a desired extent and so held by the spring clips 27.

Sedimentation tubes 25 may be the ordinary commercially available tubes or may be tubes made in a laboratory from glass tubing. In blood sedimentation tests with the new rack, an anticoagulant is added to blood in one of the narrow tubes 25 and after the tube is placed in one of the tube openings 23 of the rack the red corpuscles 32 are allowed to settle out of this suspension leaving clear plasma 33 above them. The distance of fall of the corpuscles after a given time interval is then measured on the scales 24. Other tubes 25 are similarly filled and placed in other tube openings 23 in the rack. All the tubes 25 are held uniformly and vertically in the rack. The upper level of sedimenting corpuscles may be read at frequent intervals or a single reading at the end of a longer period such as an hour may be made. The tubes 25 are each identified by the number at the bottom of the scale in front of them.

Either graduated Cutler sedimentation tubes or ungraduated tubes may be used with equally accurate results in the new rack. The graduated tubes will continue to be useful with the rack even though their graduation markings have worn off or have become marred and inaccurate.

Either graduated Cutler sedimentation tubes or ungraduated tubes may be used with equally accurate results in the new rack. The graduated tubes will continue to be useful with the rack even though their graduation markings have worn off or have became marred and inaccurate.

Figure 6:
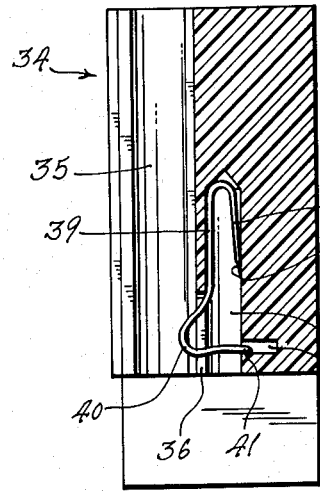
Fig. 6 is a view similar to Fig. 4 but illustrating a modification of the present invention.

The modification of the present invention illustrated in Fig. 6 is characterized by the provision of a body block member 34 having a sedimentation tube opening 35 connected by passage 36 to a spring clip recess 37 in which the upper end 38 of a spring clip 39 is frictionally held. The lower end 40 of spring clip 39 extends through passage 36 into the tube opening 35 in the manner of a leaf spring. The tip end 41 of the lower end 40 of clip 39 is bent and extends back through passage 36 into recess 37 where it is slidably held in a chamber 42 securely to hold the spring clip in the rack.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A rack for holding sedimentation tubes beside graduated scales comprising a body block member having bottom feet and a central portion supported by and bridging said feet, a front face and a plurality of spaced sedimentation tube openings adjacent said front face, a plurality of spaced graduated scales on said front face adjacent said openings, and a plurality of spring clips secured to the body block member and disposed in said openings removably to hold sedimentation tubes therein, said central portion having a plurality of spaced spring clip seating recesses disposed one behind each of said sedimentation tube openings and said spring clips each having a hairpin bent end formed with a sharp point end portion adapted frictionally to be secured in one of said spring clip seating recesses, said body block member being a single piece of plastic material and also having a top face, a bottom face, a back face and two end faces, said sedimentation tube openings being vertically disposed and extending from said top face to said bottom face and through such faces, said front face having a plurality of slit openings of smaller width than the diameters of said sedimentation tube openings connecting the front face with the sedimentation tube openings, said spaced graduated scales each being disposed at one side of one of said slit openings and partially extending across the sedimentation tube opening connected with such slit opening, said body block member being transparent and said graduated scales disposed on said front face being consecutively numbered, and disposed for sedimentation tubes to be inserted in the sedimentation tube openings to a uniform extent, and a chamber in each spring seating recess slidably to seat the other end portion of each spring clip.

2. A rack for holding sedimentation tubes comprising a body block member, a plurality of test tube receiving openings spaced along said block, a second, smaller plurality of openings in said block having contiguous passages with said first openings, tension means in said smaller openings extending into said test tube receiving openings to bias test tubes, and indicia on said block adjacent said first-named openings to indicate sedimentation.

3. The combination of claim 2, wherein said test tube receiving openings include spaced slit openings of smaller width than the test tube openings.

4. The combination of claim 2, wherein said tension means comprise spring clips with bent ends extending into said test tube receiving openings and having pointed ends frictionally seated in said chambers.

5. The combination of claim 4 wherein said bent end is semi-circular in construction.

References Cited in the file of this patent

UNITED STATES PATENTS

| | | |
|---|---|---|
| 304,263 | Edson | Aug. 26, 1884 |
| 681,305 | Forrester | Aug. 27, 1901 |
| 879,624 | Fricker | Feb. 18, 1908 |
| 1,767,190 | Sengbusch | June 24, 1947 |
| 2,429,305 | Barnes | Oct. 21, 1947 |